United States Patent [19]

Wilhelmi

[11] Patent Number: 5,598,680
[45] Date of Patent: Feb. 4, 1997

[54] JOINING ELEMENT FOR JOINING WOODEN COMPONENTS

[76] Inventor: Jürgen Wilhelmi, Hermann-Löns-Weg 6, D-28857 Syke-Wachendorf, Germany

[21] Appl. No.: 357,190

[22] Filed: Dec. 13, 1994

[30] Foreign Application Priority Data

Dec. 13, 1993 [DE] Germany .............................. 9319125 U

[51] Int. Cl.⁶ ...................................................... E04B 1/38
[52] U.S. Cl. ............................ 52/715; 403/231; 403/260; 248/300; 52/712; 52/714
[58] Field of Search ...................... 52/712, 715, 714; 403/219, 230, 231, 256, 260; 248/300, 248

[56] References Cited

U.S. PATENT DOCUMENTS

| | | | |
|---|---|---|---|
| 1,723,500 | 8/1929 | Campbell | 52/715 |
| 3,267,624 | 8/1966 | Wozniak et al. | 52/715 |
| 4,572,695 | 2/1986 | Gilb | 403/230 X |
| 4,893,961 | 1/1990 | O'Sullivan et al. | 52/715 X |
| 4,920,713 | 5/1990 | Borrensen et al. | 52/712 X |
| 5,186,571 | 2/1993 | Hentzchel | 403/231 |
| 5,380,115 | 1/1995 | Colonias | 403/219 X |

FOREIGN PATENT DOCUMENTS

| | | | |
|---|---|---|---|
| 543324 | 3/1953 | Canada | 52/714 |
| 2330816 | 7/1977 | France | 52/712 |
| 4124553 | 3/1992 | Germany . | |
| 2062644 | 2/1980 | United Kingdom | 52/712 |

OTHER PUBLICATIONS

Abstract from WILA–GMA, No. 20, 17 May 1990, DE–U–90 01 067.
Abstract, DE–U–92 05 490, 13 Aug. 1992.
Abstract, DE–U–93 12 522, 3 Feb. 1994.

*Primary Examiner*—Carl D. Friedman
*Assistant Examiner*—Yvonne Horton Richardson
*Attorney, Agent, or Firm*—Kenyon & Kenyon

[57] ABSTRACT

The present invention relates to a joining element, made of thin sheet metal, for joining a wooden component such as a beam or a post to a second component made of wood or another material, in particular for a concealed beam attachment or a post foot. The joining element has a planar attachment web provided with through holes which is to be inserted into a slot in the wooden on the end surface of the wooden component to be attached. The joining element is fastened with fasteners such as dowels which, in the assembled state, extend through the through holes. At least two fastening flanges are provided on the joining element, each with through holes, and are generally bent 90 degrees from the plane of the attachment web and configured integrally with the attachment web.

23 Claims, 3 Drawing Sheets

JOINING ELEMENT FOR JOINING WOODEN COMPONENTS

BACKGROUND OF THE INVENTION

1. Field of the Invention

The present invention relates to a joining element, made of thin sheet metal, for the concealed joining of a wooden component such as a beam or a post to a second component made of wood or another material. In particular the present invention is for a concealed beam attachment or a post foot, and has a planar attachment web provided with through holes which is to be inserted into a slot, generally on the end surface of the wooden component to be attached. The present invention is fastened or held with fasteners such as dowels or the like which, in the assembled state, extend through the through holes. At least two fastening flanges are provided on the present invention, each provided with through holes, and are generally bent 90 degrees from the plane of the attachment web and configured integrally with the attachment web. Each of the webs are laterally spaced away from the rear edge, which forms the fold or bending line between the attachment web and the fastening flanges and lies in a first main axis of the joining element of the attachment web, such that a second main axis of the joining element, lying at right angles to the first main axis and in the plane of the fastening flanges, extends substantially centered between the outer edges of the outer fastening flanges which extend perpendicular to the fold or bending line.

2. Discussion of the Prior Art

In wooden construction, a concealed joint is understood to be a joint in which the joining element, also referred to as a "fitting," is at least substantially surrounded by the wooden components. In a completely concealed joint, in which even the receiving slot is not visible externally, the slot is configured not as a continuous slot but as a "blind slot," in order to weaken the respective wooden component as little as possible and to prevent the slot from being visible after assembly. Available for this purpose are "keyway cutters," although their smallest slot width is 7 mm. Continuous slots are recessed automatically, generally with a circular saw, into the end surface of a beam. The minimum thickness of circular saw blades of a size suitable for common beam dimensions is also similar to the aforesaid cutting width.

Since the thickness of the attachment web of a joining element must, according to applicable specifications, be no more than 1 mm less than the slot width in order to prevent the attachment web from "wobbling" in the slot, the sheet thickness of such joining elements has previously been generally at least 6 mm. Entirely disregarding the fact that at this thickness the joining elements are generally considerably overdimensioned in terms of strength and moreover require an unnecessary expenditure of material, it is known that thicker sheets are more difficult and complex to work. For reasons of cost effectiveness, therefore, it would be desirable to reduce significantly the material thickness of the joining elements under discussion here, and embody them, for example, with a sheet thickness of only up to 3 mm.

With this purpose, it has already been proposed in German Utility Model 90 01 067 to manufacture a joining element from a thin sheet approximately 3 mm thick, and to provide its attachment web with shaped-in knobs or beads whose height is substantially equal to the slot width of the wooden component being attached. Although the risk of wobbling in a slot at least twice as wide can be reduced with a fitting of this kind, nevertheless with such thin sheet metal the number of through holes, and the number of fasteners to be installed in them, must be correspondingly large, since otherwise the permissible hole face pressure in the through holes will be exceeded.

German Utility Model 92 05 490 has proposed a thin-sheet perforated fitting in which the through holes of the attachment web are crimped over at their edges, preferably in groups, to one or the other side of the attachment web, such that the sum of the sheet thickness and the height of the crimps is slightly less than the predefined slot width of the wooden component being attached. This configuration has proved very successful, since this feature on the one hand results in a considerable increase in the effective thickness of the thin attachment web, which counteracts or prevents wobbling, and on the other hand results in a considerable increase in the contact surface of the fastening means in the through holes, with a corresponding decrease in hole face pressure. However, it has been found that, particularly when high stresses are exerted on the perforated sheet-metal fitting known from German Utility Model 92 05 490, the fastening flange adjacent to the attachment web can shift inward in the region of the slot into the wood of the wooden component being attached. The reason for this is that the fastening flange laterally adjacent to the attachment web is too narrow, or is present only at one side of the attachment web. Although in this previously-known perforated sheet metal fitting the other fastening flange extends symmetrically on either side of the first main axis and thus on either side of the attachment web, in the known perforated sheet-metal fitting this fastening flange necessarily lies above the right-angle attachment web and cannot always prevent the aforesaid negative effects, at least under extreme stress.

German Patent No. 41 24 553 has disclosed a metal connector for concealed beam attachments which is constituted by two thin-walled sheet-metal parts which are configured with mirror symmetry with respect to the plane of symmetry of the attachment web, specifically, two shaped panels each folded or bent at right angles, such that one folded section forms a fastening flange, and the other section forms part of the attachment web. The latter section is in each case meander-shaped, such that contact sections alternate with substantially groove-shaped curved sections. The groove-shaped curved sections, together with the respective corresponding curved section of the other shaped element, form a channel whose thickness is slightly less than the slot width.

It is immediately evident that this known joining element is complex due to the fact that it consists of two parts, and its installation is thus also relatively difficult.

A feature common to all previously known joining elements is that they are intended and suitable only for beam attachments, so that ordinarily other elements or apparatus must be used to support posts. Reference in this regard is made, for example, to a post foot according to German Utility Model 93 12 522.

SUMMARY OF THE INVENTION

The underlying object of the present invention is to create a one-piece joining element, made in particular of thin sheet metal, in which the disadvantageous effects described above do not occur even under extreme stresses that lie within the allowable range. In addition, it is an object of the present invention to provide a joining element which is suitable not only as a fitting for concealed attachment of a beam, but also as a post foot.

According to the present invention, this object is achieved by the fact that each of the two outer fastening flanges extends, with its outer end section facing away from the second main axis, from the first side which lies laterally with respect to the first main axis of the joining element, to the second side which lies laterally with respect to the first main axis of the joining element.

The joining element according to the invention can have more than two fastening flanges; for example a third fastening flange could be located between the two outer fastening flanges, although preferably provision is made for the joining element according to the invention to have only two fastening flanges.

According to a preferred embodiment, at least one edge section of the attachment flange, proceeding from an end point of the fold or bending line, runs at an acute angle to the plane of the fastening flanges, preferably at an angle of approximately 45 degrees. In a particularly preferred embodiment, both edge sections of the attachment flange, each proceeding from an end point of the fold or bending line, extend at an acute angle, preferably in such a way that the attachment flange is mirror-symmetrical with respect to the second main axis of the joining element.

The two outer fastening flanges are preferably substantially congruent if they are laid on one another and one fastening flange is rotated through 180 degrees.

DETAILED DESCRIPTION OF THE INVENTION

Figure 1:
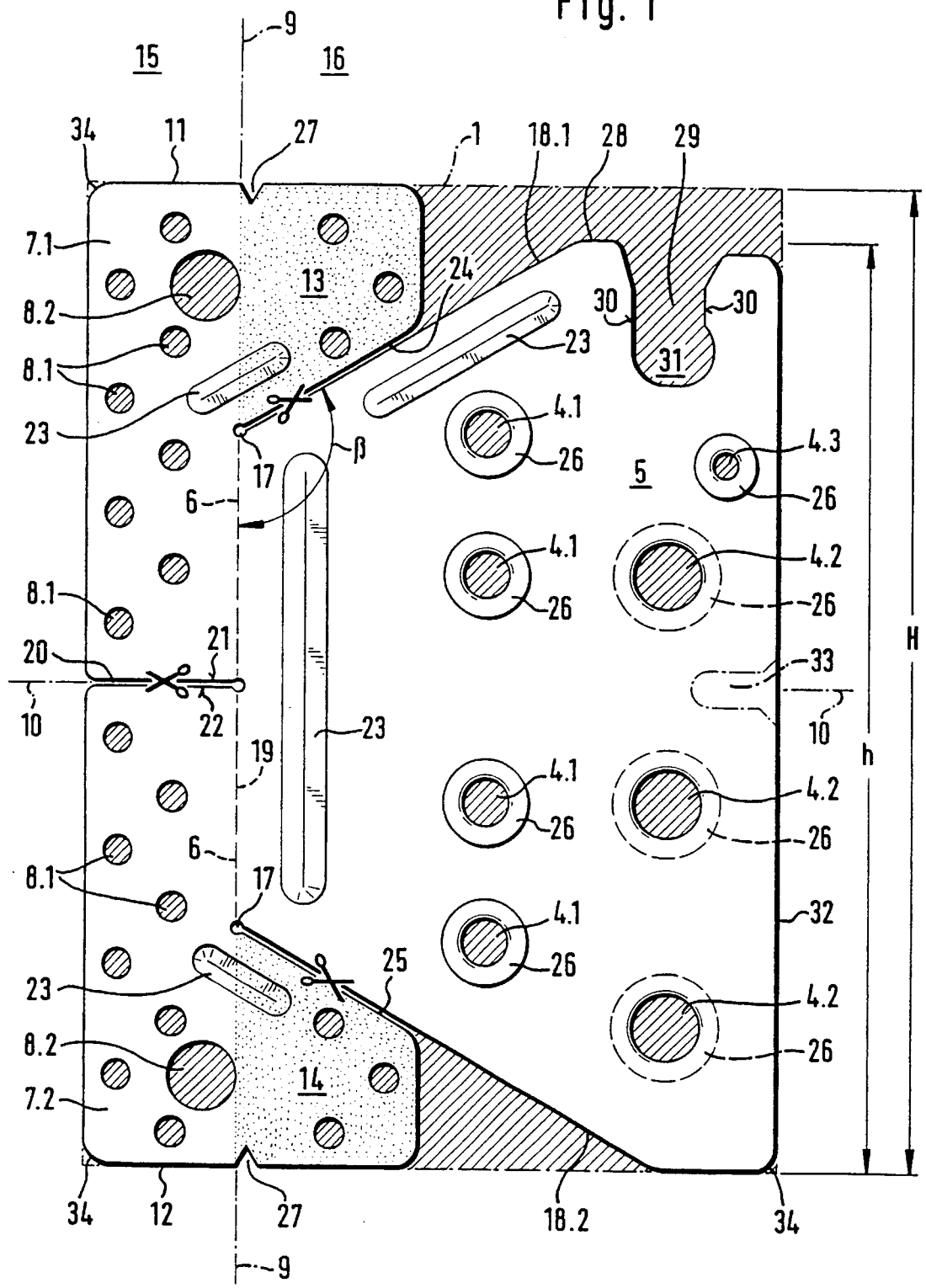
FIG. 1 shows the finished cut sheet for a joining element according to the invention before its attachment web is folded and bent upward, and before one fastening flange is pivoted 180 degrees.

FIG. 1 shows a cut sheet 1, surrounded by a dot-dash line, for a one-piece joining element 2 made of 3-mm thick sheet steel. The joining element 2 is for concealed joining of one wooden component, such as a beam or a post, to a second component 3, which may be for example a beam extending perpendicularly (FIG. 2), or may also for example be a foundation on which a post is to be supported (FIG. 3).

Joining element 2 has an attachment web 5, provided with through holes 4.1, 4.2, and 4.3, which in the depiction of FIG. 1 has not yet been folded and bent upward about its fold or bending line 6, depicted with a dashed line.

During installation, attachment web 5 is inserted into a slot, generally on the end surface, of the wooden component to be attached (not depicted), and fastened or held therein with fastening means such as dowels or the like, which when installed extend through through holes 4.1, 4.2, and 4.3. Joining element 2 also has two fastening flanges 7.1 and 7.2 which are also provided with through holes 8.1 and 8.2 and, when joining element 2 is complete (see FIGS. 2 and 3), are bent out 90 degrees to the plane of attachment web 5. Fastening flanges 7.1 and 7.2 are thus integrally joined to attachment web 5 and are each laterally spaced away from the rear edge of attachment web 5 which forms fold or bending line 6 between attachment web 5 and fastening flanges 7.1 and 7.2 and lies in a first main axis 9 of joining element 2 (see FIGS. 2, 3). A second main axis 10 of joining element 2, lying at right angles to first main axis 9 and in the plane of fastening flanges 7.1, 7.2, runs in substantially centered fashion between the outer edges 11 and 12, which run perpendicular to fold or bending line 6 of fastening flanges 7.1 and 7.2.

The two fastening flanges 7.1 and 7.2 each extend, with their outer end sections 13 and 14 (stippled in FIG. 1 for better illustration) which face away from second main axis 10, from the one first side 15, which lies laterally with respect to first main axis 9 of joining element 2, beyond first main axis 9, to the second side 16, which lies laterally with respect to first main axis 9 of joining element 2. One fastening flange (i.e. for example fastening flange 7.1 at the top in FIG. 1) remains in its original position according to FIG. 1, while the other fastening flange 7.2 is pivoted out of its original position visible in FIG. 1, through 180 degrees about first main axis 9, so that it then once again lies parallel to the other fastening flange 7.1 (and in the same plane) (see FIGS. 2, 3).

Both edge sections 18.1 and 18.2 of attachment flange 5, which proceed from an end point 17 of fold or bending line 6, run at an acute angle $\alpha$ to the plane of fastening flanges 7.1 and 7.2. In the exemplary embodiment depicted, this angle $\alpha$ is 40 degrees.

In the exemplary embodiment, attachment flange 5 is configured substantially with mirror symmetry about second main axis 10 of joining element 2. The two fastening flanges 7.1 and 7.2 are congruent, i.e. of the same shape, albeit mirror images of one another.

As has already been mentioned above with reference to FIG. 1, cut sheet 1 consists, in a manner known in the art, of a rectangular section of sheet metal. Rear edge 19 of attachment web 5 facing fastening flanges 7.1, 7.2, which is identical to fold or bending line 6, is visibly shorter than height H of cut sheet 1, and also shorter than height h of attachment web 5. Mutually opposite edges 18.1 and 18.2 of the section forming attachment web 5, which run at an obtuse angle $\beta$ to fold or bending line 6, are cut from end points 17 of fold or bending line 6 out to an outer edge of cut sheet 1, as indicated in each case by a scissors symbol in FIG. 1. The same applies to separation line 20 between the mutually facing inner edges 21 and 22 of fastening flanges 7.1 and 7.2, respectively.

Attachment web 5 and fastening flanges 7.1, 7.2 are each provided with stiffening beads 23. This feature is known in the art from DIN 6932. One bead 23 of attachment web 5 runs parallel to fold or bending line 6, and a further bead 23 parallel to edge section 18.1, while beads 23 of fastening flanges 7.1 and 7.2 are each arranged parallel to edges 24 and 25 of fastening flanges 7.1 and 7.2 which proceed from fold or bending line 6.

All through holes 4.1, 4.2, 4.3 of attachment web 5 are crimped over at their edges; a first group of through holes 4.1 and 4.3 is crimped over to one side, and a second group of through holes 4.2 to the other side of attachment web 5. In FIG. 1, the crimped sections of through holes 4.1, 4.2, 4.3 are given the reference symbol 26. The sum of the sheet thickness and the height of crimps 26 is approximately 1 mm less than the slot width of the wooden component being attached. The crimp height of through holes 4.1, 4.2, 4.3 is in each case approximately equal to half the sheet thickness of 3 mm.

Outer edges 11 and 12 of fastening flanges 7.1 and 7.2 are each provided at the center with a triangular notch 27; notches 27 located opposite one another considerably simplify installation of the device. The connecting line between notches 27, 27 lies on fold or bending line 6 or first main axis 9 of joining element 2.

Upper edge 28 of attachment web 5, running perpendicular to fold or bending line 6 of attachment web 5 and parallel to second main axis 10, is provided with a slot-shaped cutout 29. Edges 30 of cutout 29, running parallel to fold or bending line 6, are each slanted away from the other at their outer end section, so as to be able to function as a hook plate when joining element 2 is used as a concealed beam attachment, and be readily able to positively accommodate a suitably dimensioned bolt of the component being attached. Inner end section 31 of cutout 29 is undercut.

For utilization as a post foot, the free edge 32 of attachment web 5, running parallel to fold or bending line 6, can be provided with at least one slot-shaped cutout 33, as indicated in FIG. 1 with dashed lines and as is more clearly apparent from FIG. 3.

Mention should also be made of the fact that the greatest height of beads 23 is less than the height of crimped sections 26 of through holes 4.1, 4.2, 4.3 of attachment web 5, so that although the latter provide stiffening, they nevertheless do not counteract wobbling, since this is done in advantageous fashion by crimped sections 26.

For the production of a joining element 2 according to the invention from the rectangular cut sheet 1, the sections cross-hatched in FIG. 1 (i.e. including through holes 4.1, 4.2, 4.3, 8, and corner radii 34) can be cut out from cut sheet 1, or separated from the cut metal sheet, in a single operating step, and if applicable the stamping of beads 23 and cutting at separation line 20 and edges 24 and 25 can occur in the same operating step, or if desired in separate operating steps. Cutout 33 can, of course also be made at the same time if desired. All that is then needed is to pivot the section forming attachment web 5 90 degrees up about fold or bending line 6, and pivot fastening flange 7.2 180 degrees about first main axis 9. The fastening element 2 is then immediately ready for installation.

Figure 2:
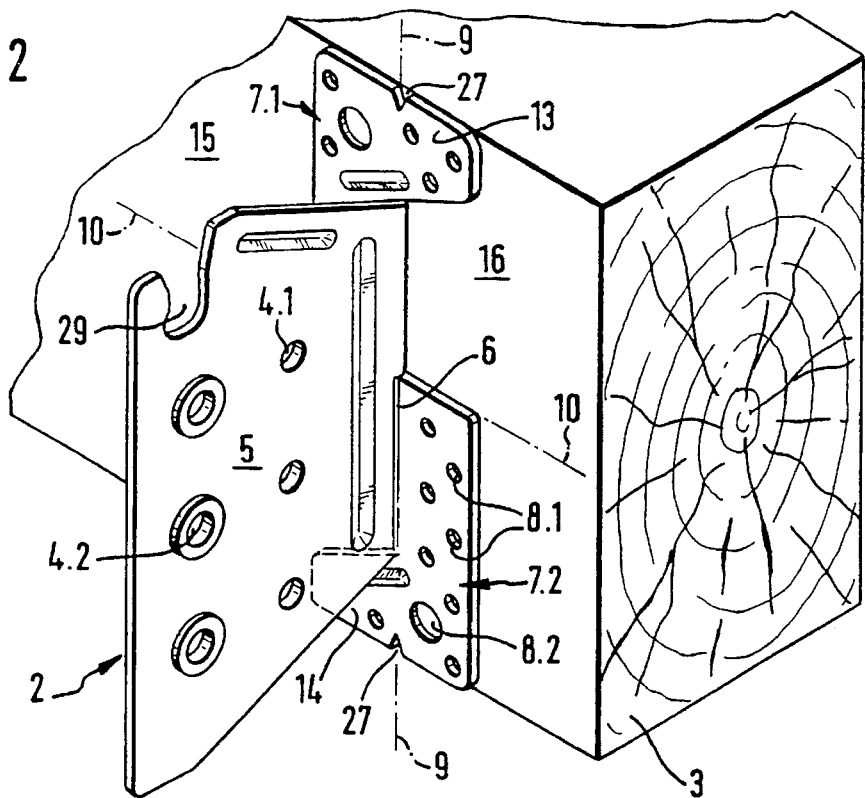
FIG. 2 shows the finished joining element in an arrangement for a concealed beam attachment, in a depiction smaller than in FIG. 1.
Figure 3:
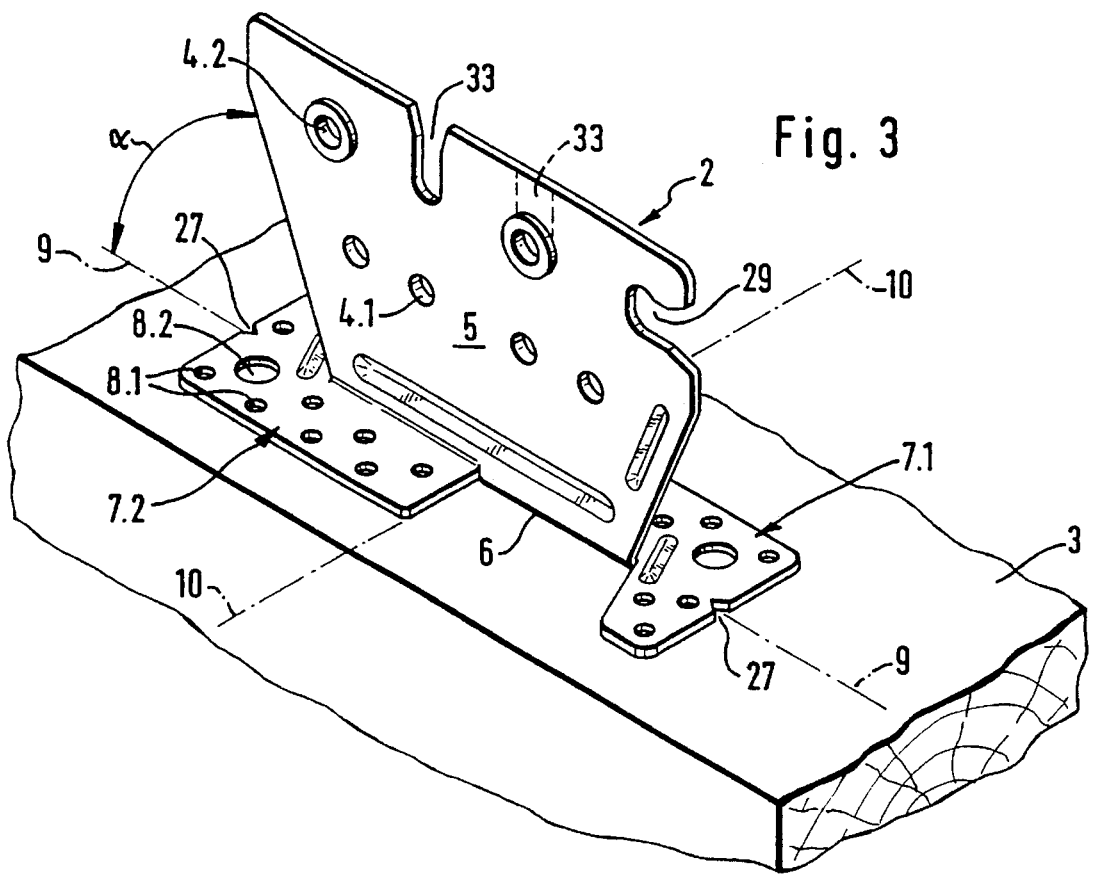
FIG. 3 shows the finished joining element in an arrangement as a post foot, in a depiction smaller than in FIG. 1.
Figure 4:
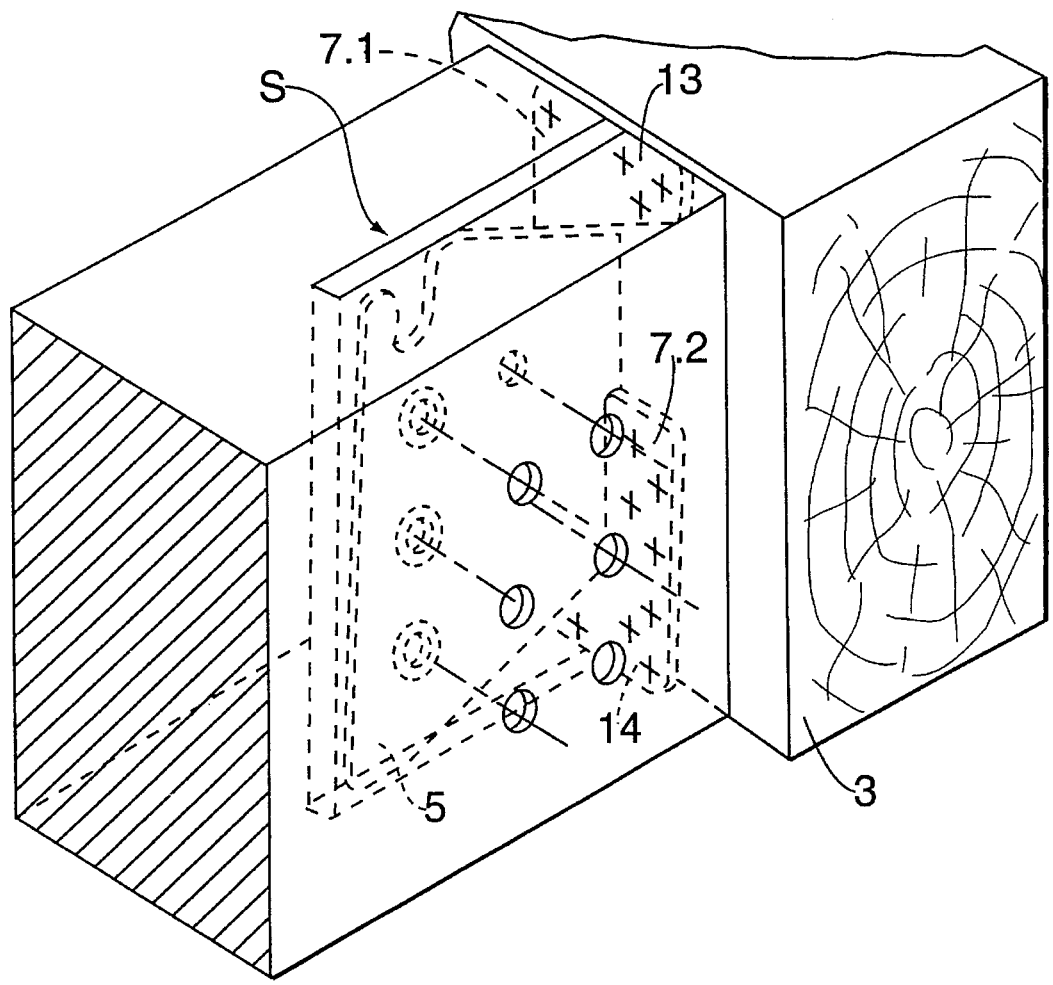
FIG. 4 shows the finished joining element inserted into a slot.

FIG. 2 shows, in exemplary and somewhat schematic fashion, the utilization of a joining element 2 according to the invention as a sheet-metal fitting for attaching a beam (not depicted), slotted at its end, to a second beam running at right angles thereto and designated in FIG. 2 as 3. Joining element 2 is fastened with nails and/or pegs to second beam 3; notches 27, 27 facilitate accurate alignment thereof. Attachment web 5 is then introduced into the end-surface slot 5 of the first beam being attached, and fastened thereto with dowels which are driven through through holes 4.1 and 4.2; during assembly, the first beam can immediately be suspended in slot-shaped cutout 29. Since the outer end sections 13, 14 of fastening flanges 7.1, 7.2 extend respectively to either side 15, 16 of first main axis 9, the disadvantageous phenomena described above in discussing the prior an no longer exist, even if high stresses within the limits of permissibility occur.

As is already apparent from the foregoing, however, joining element 2 according to the invention can be used not only as a perforated sheet-metal fitting for concealed beam attachment, but also as a post foot, as indicated in FIG. 3. It is obvious that because of cutout 33, immediate immobilization of the post is possible if assembly pegs have already been inserted into the foot section of the post at the factory. Moreover, this one-piece post foot obviously results in the same advantages as with utilization of joining element 2 according to the invention as a perforated sheet-metal fitting for a beam attachment, especially since overall symmetrical fastening to a foundation 3 or the like can take place, so that with this type of application as well, the disadvantageous phenomena described above cannot occur.

I claim:

1. A joining element in combination with wooden components for joining a first wooden component having a slot at an end surface to a second component, said joining element being constructed of a substantially rectangular section of a sheet of metal and comprising:

a planar attachment web provided with through holes, said attachment web being insertable into said slot of said first wooden component;

a first and a second fastening flange fastenable to said second component, each of said fastening flanges being provided with through holes, said fastening flanges being bent away from the plane of said attachment web to opposite sides of said attachment web at a bending line provided by a rear edge of said attachment web, said fastening flanges being substantially congruent, whereby said rear edge of said attachment web is positioned on a first main axis of said joining element and is of a length shorter than a height of said sheet section, and whereby an upper edge of said fastening flanges and a lower edge of said attachment web are cut and extend from said bending line at an obtuse angle to said bending line, and wherein an outer section of each of said fastening flanges extends to opposite sides of said attachment web.

2. The joining element of claim 1, wherein:

at least one edge of said attachment flange extends from an end point on said bending line, and wherein said at least one edge extends at an acute angle to a plane of said fastening flanges.

3. The joining element of claim 1, wherein:

at least two edges of said attachment flange extend from end points on said bending line, and wherein said at least two edges extend at acute angles to a plane of said fastening flanges.

4. The joining element of claim 2, wherein:

said acute angle is approximately 45 degrees.

5. The joining element of claim 1, wherein:

said attachment flange is symmetrical with respect to a second main axis perpendicular.

6. The joining element of claim 1, further comprising:

stiffening beads.

7. The joining element of claim 6, wherein:

said stiffening beads are on said attachment web, and wherein said beads are arranged substantially parallel to said bending line.

8. The joining element of claim 6, wherein:

said stiffening beads are on said attachment web, and wherein said stiffening beads extend substantially parallel to edge sections of said attachment web.

9. The joining element of claim 6, wherein:

said stiffening beads are on said fastening flanges, and wherein said beads are substantially parallel to edges of said fastening flanges which extend from said bending line.

10. The joining element of claim 1, wherein:

at least one of said through holes of said attachment web is crimped at its edge.

11. The joining element of claim 10, wherein:

all said through holes of said attachment web are crimped at their edges.

12. The joining element of claim 11, wherein:

a first group of said through holes of said attachment web is crimped on one side of said attachment web, and a second group of through holes of said attachment web is crimped on another side of said attachment web.

13. The joining element of claim 10, wherein:

a sum of a thickness of said sheet and a height of said crimps is approximately 1 mm less than a width of said slot of said wooden component.

14. The joining element of claim 10, wherein:

a height of said crimp is approximately equal to half of a thickness of said sheet.

15. The joining element of claim 10, wherein:

said sheet has a thickness of approximately 3 mm.

16. The joining element of claim 6, wherein:

at least one of said through holes of said attachment web is crimped, and wherein a height of said beads is less than a height of said crimp.

17. The joining element of claim 1, wherein:

outer edges of said fastening flanges are each provided with a triangular notch.

18. The joining element of claim 17, wherein:

a connecting line between said notches lies on said bending line.

19. The joining element of claim 1, wherein:

an upper edge of said attachment web perpendicular to said bending line is provided with a slot-shaped cutout.

20. The joining element of claim 19, wherein:

edges of said slot-shaped cutout run parallel to said bending line and are slanted away from each other at an outer end.

21. The joining element of claim 19, wherein:

an inner end of said slot-shaped cutout is undercut.

22. The joining element of claim 1, wherein:

said joining element is used in a post foot, and wherein a free edge of said attachment web running parallel to said bending line comprises at least one slot-shaped cutout.

23. The joining element of claim 1, wherein:

a height of said attachment web is less than a height of said sheet or a total height of said fastening flanges.

* * * * *